United States Patent
Tseng et al.

(10) Patent No.: US 10,820,271 B2
(45) Date of Patent: Oct. 27, 2020

(54) METHOD AND APPARATUS OF POWER SAVING FOR DISCONTINUOUS RECEPTION

(71) Applicant: FG Innovation Company Limited, Tuen Mun (HK)

(72) Inventors: Yung-Lan Tseng, Hsinchu (TW); Chie-Ming Chou, Hsinchu (TW); Yu-Hsin Cheng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/044,527

(22) Filed: Jul. 25, 2018

(65) Prior Publication Data

US 2019/0037498 A1 Jan. 31, 2019

Related U.S. Application Data

(60) Provisional application No. 62/536,549, filed on Jul. 25, 2017.

(51) Int. Cl.
| | |
|---|---|
| *H04W 52/02* | (2009.01) |
| *H04W 76/28* | (2018.01) |
| *H04W 72/04* | (2009.01) |
| *H04W 76/19* | (2018.01) |
| *H04W 16/28* | (2009.01) |

(52) U.S. Cl.
CPC ... *H04W 52/0238* (2013.01); *H04W 52/0216* (2013.01); *H04W 52/0219* (2013.01); *H04W 72/042* (2013.01); *H04W 72/046* (2013.01); *H04W 72/0413* (2013.01); *H04W 76/19* (2018.02); *H04W 16/28* (2013.01); *H04W 76/28* (2018.02)

(58) Field of Classification Search
CPC ............. H04W 52/00; H04W 52/0238; H04W 52/0216; H04W 52/0219; H04W 76/19; H04W 76/28; H04W 72/02; H04W 72/04; H04W 72/0413; H04W 72/042; H04W 72/046; H04W 16/28
See application file for complete search history.

(56) References Cited

U.S. PATENT DOCUMENTS

| | | | |
|---|---|---|---|
| 2011/0170420 A1* | 7/2011 | Xi | H04L 5/001 370/241 |
| 2013/0201884 A1* | 8/2013 | Freda | H04W 72/005 370/278 |
| 2015/0023177 A1* | 1/2015 | Xi | H04L 5/001 370/241 |
| 2016/0081020 A1* | 3/2016 | Rahman | H04W 52/0209 370/311 |
| 2016/0119969 A1* | 4/2016 | Vajapeyam | H04W 24/10 370/329 |

(Continued)

*Primary Examiner* — Candal Elpenord
(74) *Attorney, Agent, or Firm* — ScienBiziP, P.C.

(57) ABSTRACT

A method of power saving for a user equipment (UE) is provided. The method includes the following actions. A beam failure recovery configuration is received by a UE from a first base station. Whether a beam failure is detected by the UE. When the beam failure is detected during a discontinuous reception (DRX) off period, a beam recovery request is transmitted by the UE to the first base station when the UE transitions from the DRX off period to a DRX on period. A beam recovery response is received by the UE from the first base station.

6 Claims, 13 Drawing Sheets

(56) References Cited

U.S. PATENT DOCUMENTS

| | | | |
|---|---|---|---|
| 2016/0192433 A1* | 6/2016 | Deenoo | H04W 72/046 |
| | | | 370/329 |
| 2017/0195028 A1* | 7/2017 | Shimezawa | H04W 24/10 |
| 2017/0251518 A1* | 8/2017 | Agiwal | H04W 24/08 |
| 2018/0006770 A1* | 1/2018 | Guo | H04L 1/1835 |
| 2018/0219604 A1* | 8/2018 | Lu | H04B 7/0695 |
| 2018/0234960 A1* | 8/2018 | Nagaraja | H04B 17/318 |
| 2018/0270894 A1* | 9/2018 | Park | H04W 36/02 |
| 2018/0279358 A1* | 9/2018 | Babaei | H04W 72/0453 |
| 2018/0359790 A1* | 12/2018 | Ingale | H04W 8/24 |
| 2019/0089447 A1* | 3/2019 | Sang | H04W 40/36 |
| 2019/0261287 A1* | 8/2019 | Deenoo | H04W 24/08 |
| 2020/0022126 A1* | 1/2020 | You | H04W 76/27 |

* cited by examiner

METHOD AND APPARATUS OF POWER SAVING FOR DISCONTINUOUS RECEPTION

CROSS REFERENCE

This application claims the benefit and priority to of U.S. Provisional Application Ser. No. 62/536,549, filed on Jul. 25, 2017, and entitled "Power Saving Methods for Discontinuous Reception Mechanism", which is incorporated herein by reference in its entirety.

FIELD

The present disclosure generally relates to a method and apparatus for power saving in a wireless communication system.

BACKGROUND

In next generation (5G) new radio (NR) wireless communication systems, beamforming technique is one of the important features. Since 5G NR wireless networks adopt higher frequency bands than 4G wireless networks and beam operations (e.g., beamforming) are introduced to enhance the coverage and improve the data rate by concentrating the radiation power to specific beam direction in the antenna side. However, beam operations create additional power consumption. On the other hand, 5G NR wireless networks also support Discontinuous Reception (DRX) mechanism. Therefore, the DRX design with beam operations needs to be addressed.

SUMMARY

In one aspect of the present disclosure, a method of power saving for a user equipment (UE) is provided. The method includes the following actions. A beam failure recovery configuration is received by a UE from a first base station. Whether a beam failure is detected by the UE. When the beam failure is detected during a discontinuous reception (DRX) off period, a beam recovery request is transmitted by the UE to the first base station when the UE transitions from the DRX off period to a DRX on period. A beam recovery response is received by the UE from the first base station.

In another aspect of the present disclosure, a method for power saving of a base station is provided. The method includes the following actions. A beam failure recovery configuration is transmitted from the base station to the UE. A beam recovery request is received from the UE when the UE transitions from a DRX off period to a DRX on period. A beam recovery response is transmitted from the base station to the UE.

In yet another aspect of the present disclosure, a UE is provided. The UE includes a processor configured to perform the following instructions. A beam failure recovery configuration is received by a UE from a first base station. Whether a beam failure is detected by the UE. When the beam failure is detected during a discontinuous reception (DRX) off period, a beam recovery request is transmitted by the UE to the first base station when the UE transitions from the DRX off period to a DRX on period. A beam recovery response is received by the UE from the base station.

In yet another aspect of the present disclosure, a base station is provided. The base station includes a processor configured to perform the following instructions. A beam failure recovery configuration is transmitted from the base station to the UE. A beam recovery request is received from the UE when the UE transitions from a DRX off period to a DRX on period. A beam recovery response is transmitted from the base station to the UE.

DETAILED DESCRIPTION

Figure 1:
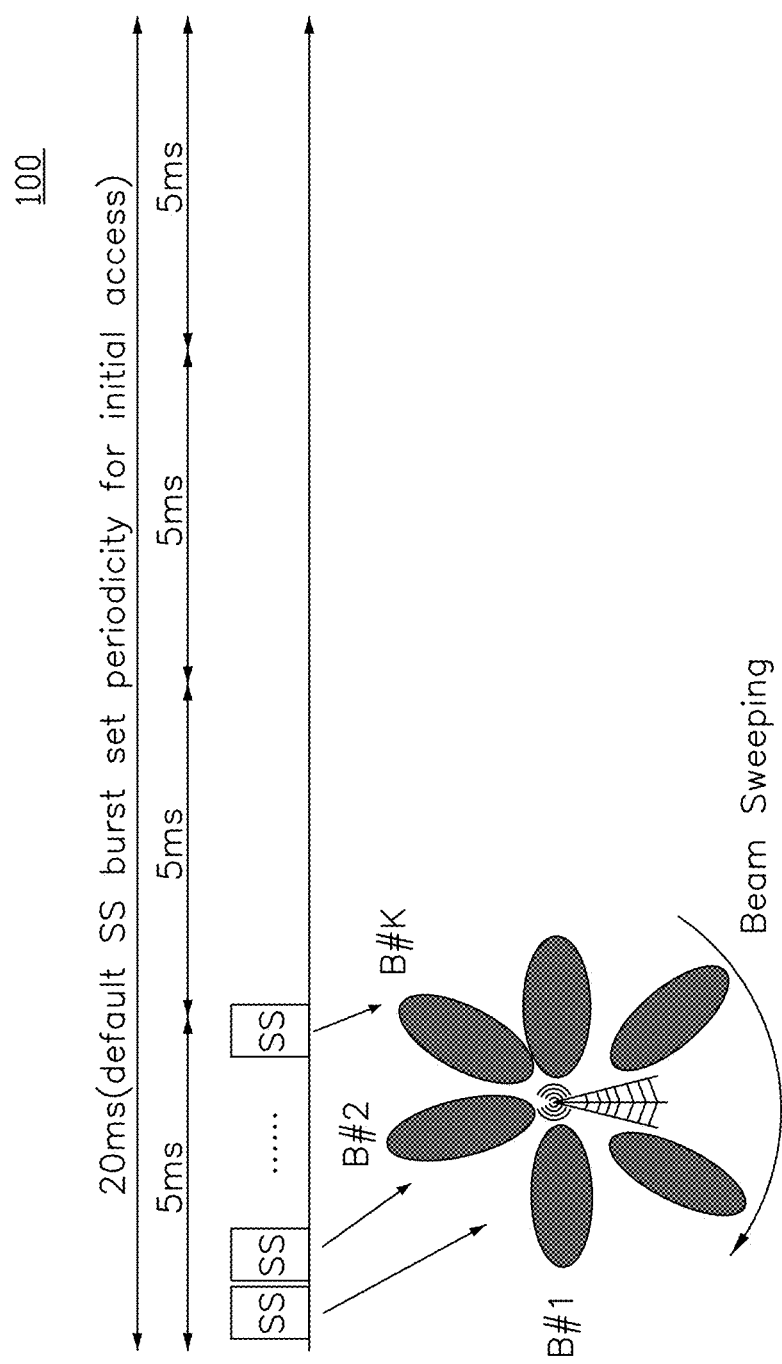
FIG. 1 is a schematic diagram of a default synchronization signal burst set periodicity for a NR wireless networks according to an exemplary implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

Several definitions that apply throughout the present disclosure will now be presented. The term "coupled" is defined as connected, whether directly or indirectly through intervening components, and is not necessarily limited to physical connections. The connection can be such that the objects are permanently connected or releasably connected.

In the present disclosure, a base station may include, but is not limited to, a node B (NB) as in the Universal Mobile Telecommunication System (UMTS), as in the LTE-A, a radio network controller (RNC) as in the UMTS, a base station controller (BSC) as in the GSM (Global System for Mobile Communication)/GERAN (GSM EDGE Radio Access Network), a ng-eNB as in an Evolved Universal Terrestrial Radio Access (E-UTRA) base station in connection with the 5G Core Network (5GC), a next generation node B (gNB) as in the 5G Radio Access Network (5G-RAN), an RRH (Remote Radio Head), a TRP (transmission and reception point), a cell, and any other apparatus capable of controlling radio communication and managing radio resources within a cell. The base station may connect to serve one or more UE(s) through a radio interface to the network.

In the present disclosure, a UE may include, but is not limited to, a mobile station, a mobile terminal or device, and a user communication radio terminal. For example, a UE may be a portable radio equipment, which includes, but is not limited to, a mobile phone, a tablet, a wearable device, a sensor, a personal digital assistant (PDA) with wireless communication capability, and other wireless devices equipping with an LTE access module or an NR (New Radio) access module. In the present disclosure, the UE is configured to communicate with a radio access network via the base station.

The UE or the base station may include, but is not limited to, a transceiver, a processor, a memory, and a variety of computer-readable media. The transceiver having transmitter and receiver configured to transmit and/or receive data. The processor may process data and instructions. The processor may include an intelligent hardware device, e.g., a central processing unit (CPU), a microcontroller, an application-specific integrated circuit (ASIC). The memory may store computer-readable, computer-executable instructions (e.g., software codes) that are configured to cause processor to perform various functions. The memory may include volatile and/or non-volatile memory. The memory may be removable, non-removable, or a combination thereof. Exemplary memory may include solid-state memory, hard drives, optical-disc drives, and etc. The computer storage media stores information such as computer-readable instructions, data structures, program modules or other data. Computer-readable media can be any available media that can be accessed and include both volatile and non-volatile media, removable and non-removable media. By way of example, and not limitation, the computer-readable media may comprise computer storage media and communication media. The computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices.

FIG. 1 is a schematic diagram of a default synchronization signal burst set periodicity for a NR wireless networks according to an exemplary implementation of the present disclosure. In NR wireless networks, the base station (e.g., gNB) would deliver Synchronization Signal (SS) burst set periodically for a user equipment (UE) to synchronize with the base station. As shown in FIG. 1, a SS burst set periodicity is configured by gNB (e.g. 20 ms), and each SS burst set is confined in 5 ms window within the SS burst set periodicity. Each SS burst set includes one or more SS bursts (shown as 'SS' in FIG. 1) and the number of SS bursts in the SS burst set is also configured by the base station. Each SS burst includes one or more SS blocks. In time domain, the base station would sweep the downlink (DL) beams and broadcast one SS burst in each beam direction (e.g., B#1, B#2, . . . , B#k) within the SS burst set. Meanwhile, the UE monitors SS burst sets to synchronize with the base station. For example, the UE scans and measures the signal strengths of each SS burst (e.g. Received Signal Strength Indicator (RSSI), Reference Signal Received Power (RSRP)) for beam selection.

It is noted that each SS burst includes synchronization signalings (e.g., Primary Synchronization Signal (PSS), Secondary Synchronization Signal (SSS)), broadcasting channel (e.g. Physical Broadcast Channel, PBCH) and reference signal (e.g. Demodulation Reference Signal, DM-RS). By decoding SS burst sets, the UE obtains the Beam ID of each beam (e.g. by decoding the PBCH). Therefore, the UE could implement a DL beam selection by monitoring the SS burst set. After the DL beam selection, the UE would implement random access procedures with the base station. In NR wireless networks, further cooperation about beamforming procedures can be achieved by the message exchange during the random access procedure.

The UE needs to maintain the downlink/uplink (DL/UL) beams to synchronize with the base station continuously. However, beamforming procedures may fail because of many reasons, such as UE mobility, poor channel condition, or DRX mechanism. Once the UE finds out the DL/UL beam fails, the UE implements beam recovery procedure, which means that UE re-find appropriate DL/UL beam(s). The random access procedure can also be applied for the UE to implement beam recovery procedure. In this disclosure, both the Contention-Free Random Access (CFRA) procedure and Contention-Based Random Access (CBRA) procedure could be applied for the UE and base station to realize beam recovery procedure.

Figure 2:
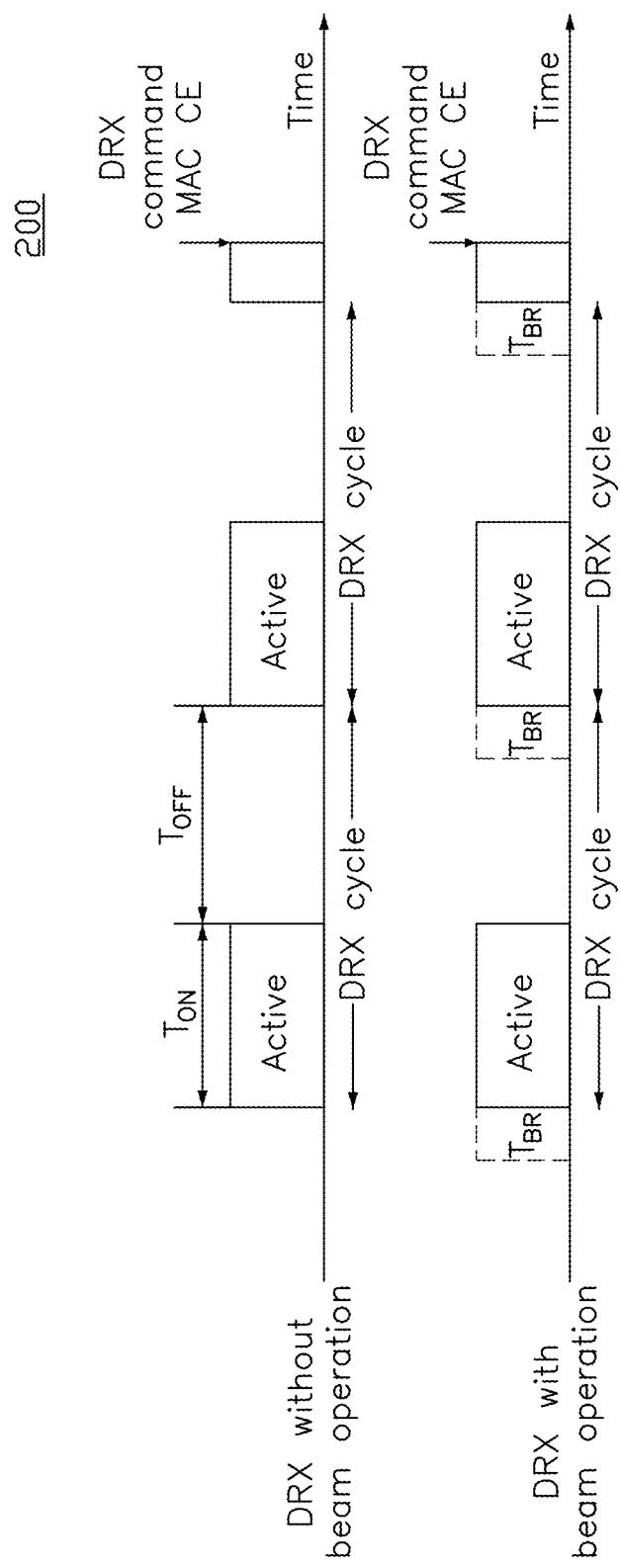
FIG. 2 is a schematic diagram of a comparison of a DRX configuration with and without beam operation according to an exemplary implementation of the present disclosure.

FIG. 2 is a schematic diagram 200 of a comparison of a DRX configuration with and without beam operation according to an exemplary implementation of the present disclosure. The DRX configuration is configured by the base station to the UE through dedicated signaling (e.g. Radio Resource Control (RRC) signaling) or broadcasting (e.g. through system information). The DRX configuration includes one or more timers, such as onDurationTimer, drx-InactivityTimer, and drx-Cycle. The DRX configuration may be applied to UEs in RRC connected state, RRC inactive state, and RRC idle state respectively.

As shown in FIG. 2, the DRX cycle specifies the periodic repetition of the on duration period (e.g., $T_{ON}$) followed by a possible period of inactivity (e.g., $T_{OFF}$). The default time span of the on duration period is decided by the onDurationTimer in the DRX configuration. During the on duration period, the UE keeps monitoring the downlink control channels (e.g. Physical Downlink Control Channel, PDCCH). The time period that UE monitors downlink control channels continuously is called active time. It is noted that, in some implementations, the time span of the active time in each DRX cycle might be different because of many factors. For example, the UE decides the duration of the active time based on DRX configuration and actual packet transmission/reception statuses (e.g. DL/UL Hybrid Automatic Repeat ReQuest (HARQ) process, Scheduling Request procedure) during the active time.

In one implementation, when a DRX Command Medium Access Control (MAC) Control Element (CE) is received by the UE during the on duration period, the UE stops the active time, and thus the active time is shorter than the default DRX on period. After the termination of active time, the UE would not monitor downlink control channels from the base station until the next DRX cycle.

In another implementation, when a downlink packet is received by the UE during the on duration period, the UE would not stop the active time and will stay in the active time until the transmission is finished, and therefore the active time is longer than the default on duration period. In this disclosure, the "DRX on period" (e.g., $T_{ON}$) is used hereinafter to represent the active time of the DRX cycle, and the "DRX off period" (e.g., $T_{OFF}$) is used hereinafter to represent the time period after the UE terminates the active time until the next DRX on period.

Moreover, when a beam operation (e.g., beamforming technique) is adopted, the UE needs to implement beam recovery procedure (e.g., $T_{BR}$) prior to each DRX on cycle. Therefore, the beam recovery procedure would create additional overhead to the DRX mechanism. In addition, the overhead problem would be more severe if there is no pending packet to the UE. Although the base station could instruct the UE to move to DRX off state by delivering a DRX Command MAC CE to the UE. However, the MAC Command MAC CE can be delivered only after the beam recovery procedure. Furthermore, in the Carrier Aggregation (CA) and Dual Connectivity (DC) scenarios, since the active time applies to all the active cells connected to the UE, which means that all the active cells with beam failures would need to implement beam recovery procedure, and thus additional power consumption would be required. Therefore, in this disclosure, several methods for power saving for the UE are provided as follows.

Figure 3:
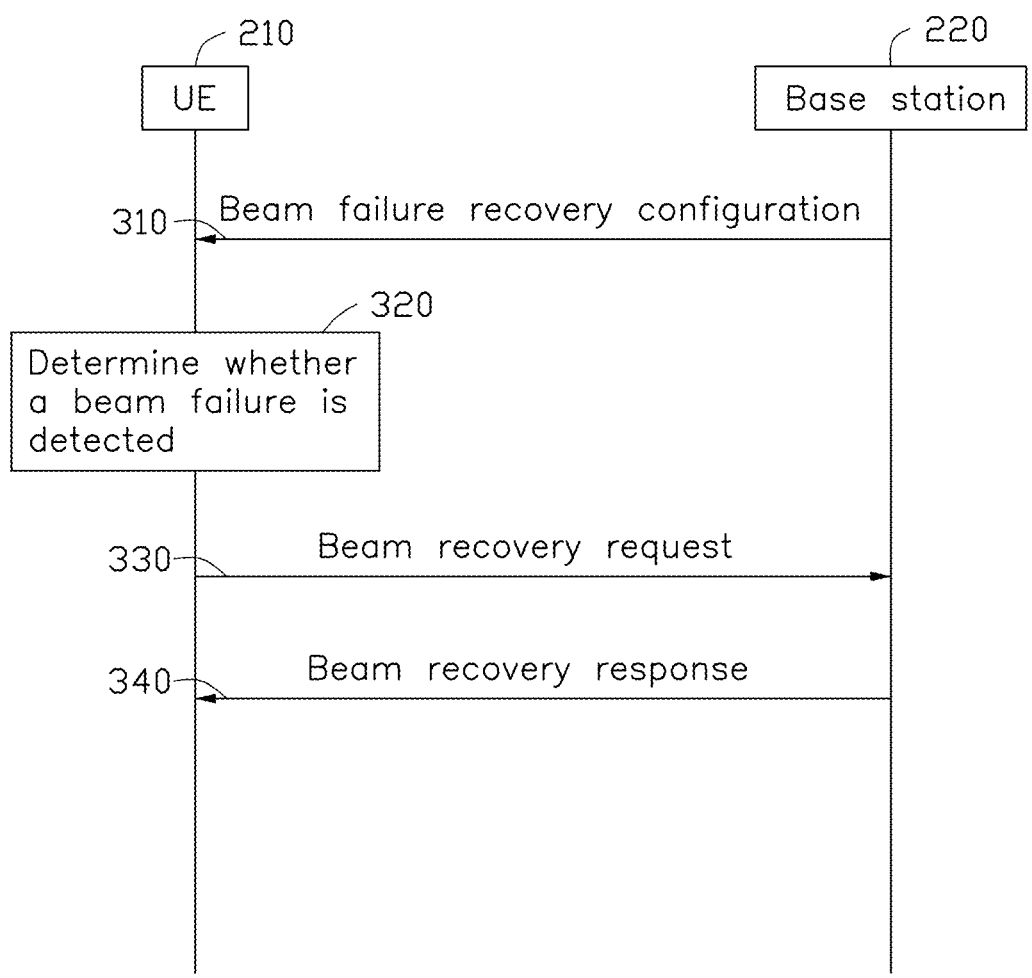
FIG. 3 is a schematic diagram of a method of power saving for a UE according to an exemplary implementation of the present disclosure.

FIG. 3 is a schematic diagram of a method 300 of power saving for a UE according to an exemplary implementation of the present disclosure. As shown in FIG. 3, a wireless communication system may include at least one base station (e.g., 220) and at least one UE (e.g., 210). In this implementation, the at least one base station (e.g., 220) is configured to communicate with the at least one UE (e.g., 210) through a radio access network. The at least one base station (e.g., 220) may include one or more cells (not shown).

In action 310, the UE 210 receives a beam failure recovery configuration from the base station 220. In action 320, the UE 210 determines whether a beam failure is detected. When the failure is detected during a DRX off period, action 330 is performed. In action 330, the UE 210 transmits a beam recovery request to the base station 220 when the UE transitions from the DRX off period to a DRX on period. In action 340, the UE 210 receives a beam recovery response from the base station 220.

In one implementation, the beam recovery request is transmitted from the UE 210 to the base station 220 during a time period before and/or after the UE transitions from the DRX off period to a DRX on period (e.g., −10 ms~+10 ms).

Figure 4:
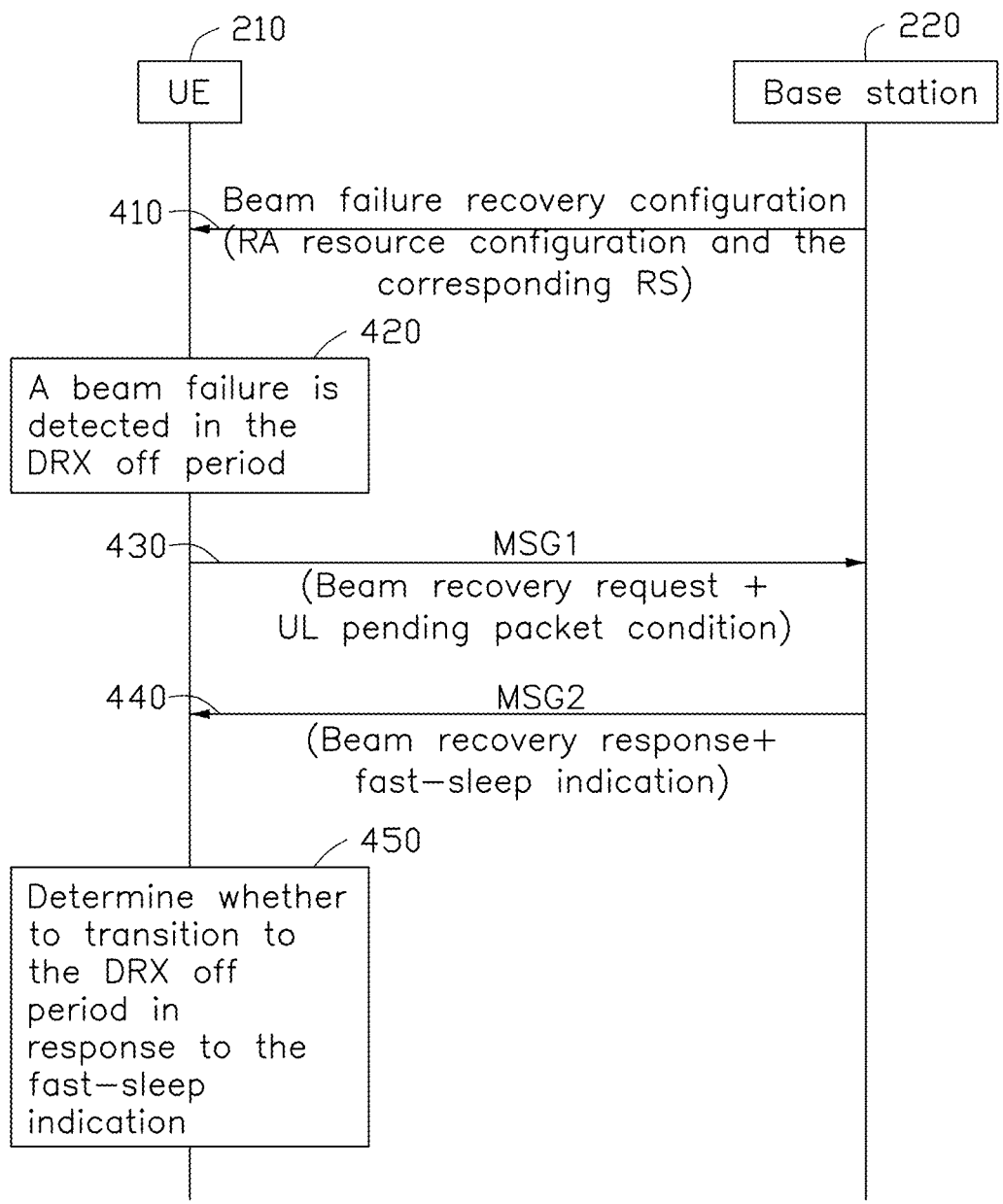
FIG. 4 is a schematic diagram of a method of power saving for a UE according to an exemplary implementation of the present disclosure.

FIG. 4 is a schematic diagram of a method 400 of power saving for a UE according to an exemplary implementation of the present disclosure. In this exemplary implementation, a wireless communication system includes a UE 210 and a base station 220. In action 410, the UE 210 receives a beam failure recovery configuration from the base station 220. In this exemplary implementation, a CFRA procedure is applied for the beam recovery procedure. In one implementation, the beam failure recovery configuration includes at least one association between a random access resource configuration and a corresponding reference signal. The reference signal may include a SS block or a Channel State Information-Reference Signal (CSI-RS).

TABLE 1

Association between RACH resource configuration and reference signal Association set#1

| Association index | #1 |
|---|---|
| Associated SS block index | SS_B#k |
| Preamble index | Preamble#1 |
| Physical resources for random access | PRB#i-PRB#j |
| Reference signal for beam recovery | CSI-RS index: CSI-RS#1 |

As shown in Table 1, in each association set, the base station 220 indicates a set of RACH resources with the associated SS block (e.g., SS_B#k) by indicating the associated SS block index (e.g., #1). The RACH resources may include Preamble index (e.g., Preamble#1) and Physical resources for random access (e.g., PRB#i-PRB#j). The UE 210 could identify the SS block (e.g. by decoding the Physical Broadcasting Channel in each SS block). In some implementations, multiple RACH resources are configured for one associated SS block. In some other implementations, RACH resources are configured for a part of the SS blocks. After receiving these association sets, the UE may apply the association sets for CFRA procedure consistently for beam recovery in each DRX cycle. Each association set between RACH resource & SS block to a UE would be indexed by the base station. Therefore, the base station could add, modify, or release each association set by indicating the association index.

In another example, the association between a UE-specific RACH resource and reference signal for beam recovery (e.g., CSI-RS) may be configured by the base station 220. The pattern of CSI-RS could be configured and indexed by the base station. Thus, the UE could identify the CSI-RS pattern by reading the CSI-RS index.

In action 420, a beam failure is detected in the DRX off period by the UE. In action 430, the UE 210 transmits a beam recovery request via MSG1 to the base station 220 when the UE transitions from the DRX off period to a DRX on period. In this implementation, the UE 210 transmits the MSG1 based on the association set(s) configured by the base station 220. For instance, the UE 210 selects at least one SS block index after monitoring the SS burst set (e.g., by measuring the signaling strength of each SS block). Afterwards, the UE 210 transmits the MSG1 in response to the RACH resources in the association set.

In one implementation, the base station 220 may configure (e.g. through the beam failure recovery configuration) the UE to report an UL pending packet condition in MSG1. For example, the UL pending packet condition may be represented by different preambles. Specifically, two preambles (e.g., Preamble#2 and Preamble#3) in one association set are configured by the base station 230, where Preamble#2 indicates that there is no pending UL packet, and Preamble#3 indicates that there is pending UL packet. Thus, the base station 220 may identify the UL pending packet condition of the UE 210 after receiving the MSG1.

In another example, a UL pending packet indication bit is included in the MSG1 (e.g., "1" indicates that there is pending UL packet, and "0" indicates that there is no pending UL packet). In yet another example, a UL buffer status report (e.g. UL buffer status report defined in LTE wireless networks) is transmitted via the MSG1.

In another implementation, the base station 220 may configure a threshold (e.g., $T_{UPR}$ bytes) to the UE (e.g. in the beam failure recovery configuration). When the total amount of UL pending packets is greater than $T_{UPR}$, the UE 210 reports the UL pending packet condition.

In action 440, the UE 210 receives a beam recovery response via MSG2 from the base station 220. In one implementation, a fast-sleep indication is generated by the base station 220, and then be transmitted to the UE via MSG2. In action 450, the UE determines whether to transition to the DRX off period in response to the fast-sleep indication. For example, when the fast-sleep indication is set to be "1", the UE transitions to the DRX off period. On the other hand, when the fast-sleep indication is set to be "0", the UE monitors the downlink control channels to receive the DL pending packets.

In some implementations, the fast-sleep indication is generated in response to a downlink pending packet condition. For example, after receiving MSG1, the base station 220 could identify which UE is sending the MSG1 and whether there is DL pending packets for the UE. When there is no DL pending packets for the UE 210, the base station 220 instructs the UE to transition to the DRX off period directly by providing a fast-sleep indication (e.g., fast-sleep indication "1") to the UE. Alternatively, when there is DL pending packets for the UE 210 (e.g., fast-sleep indication "0"), the UE monitors the downlink control channels to receive the DL pending packets.

In some other implementations, the fast-sleep indication is generated in response to the UL pending packet condition received MSG1 (in action 430). When there is no UL pending packets from the UE 210, the base station 220 instructs the UE to transition to the DRX off period directly by providing a fast-sleep indication (e.g., fast-sleep indication "1") to the UE. Alternatively, when there is UL pending packets from the UE 210 (e.g., fast-sleep indication "0"), the UE will stay in the DRX on period.

In some other implementations, both UL pending packet condition and DL pending packet condition are considered by the base station 220. In some other implementations, although there are UL pending packets or DL pending packets, the base station 220 configures the UE 210 to transition to the DRX off period by the fast-sleep indication.

Figure 5A:
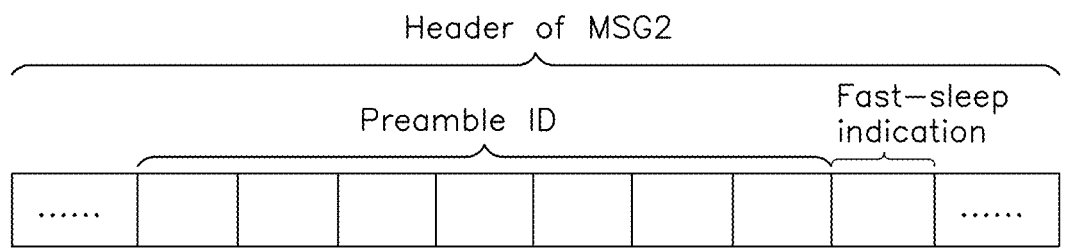
FIGS. 5A and 5B are schematic diagrams of two examples of a fast-sleep indication according to an exemplary implementation of the present disclosure.
Figure 5B:
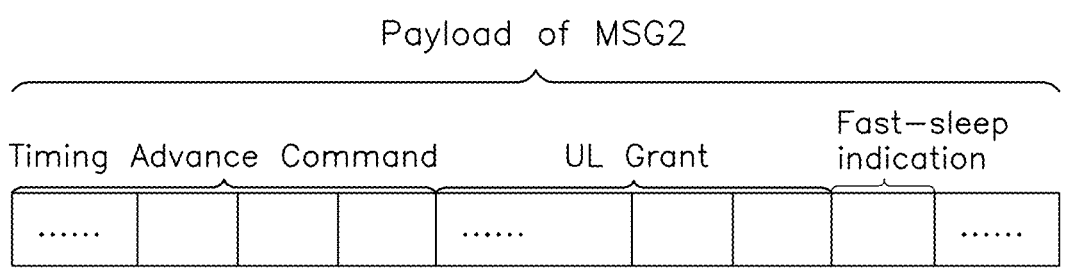

FIGS. 5A and 5B are schematic diagrams 510 and 520 of two examples of a fast-sleep indication according to an exemplary implementation of the present disclosure. In one implementation, the fast-sleep indication is provided in the Header of MSG2, as shown in FIG. 5A. In another implementation, the fast-sleep indication is provided in the payload of MSG2, as shown in FIG. 5B.

Figure 6:
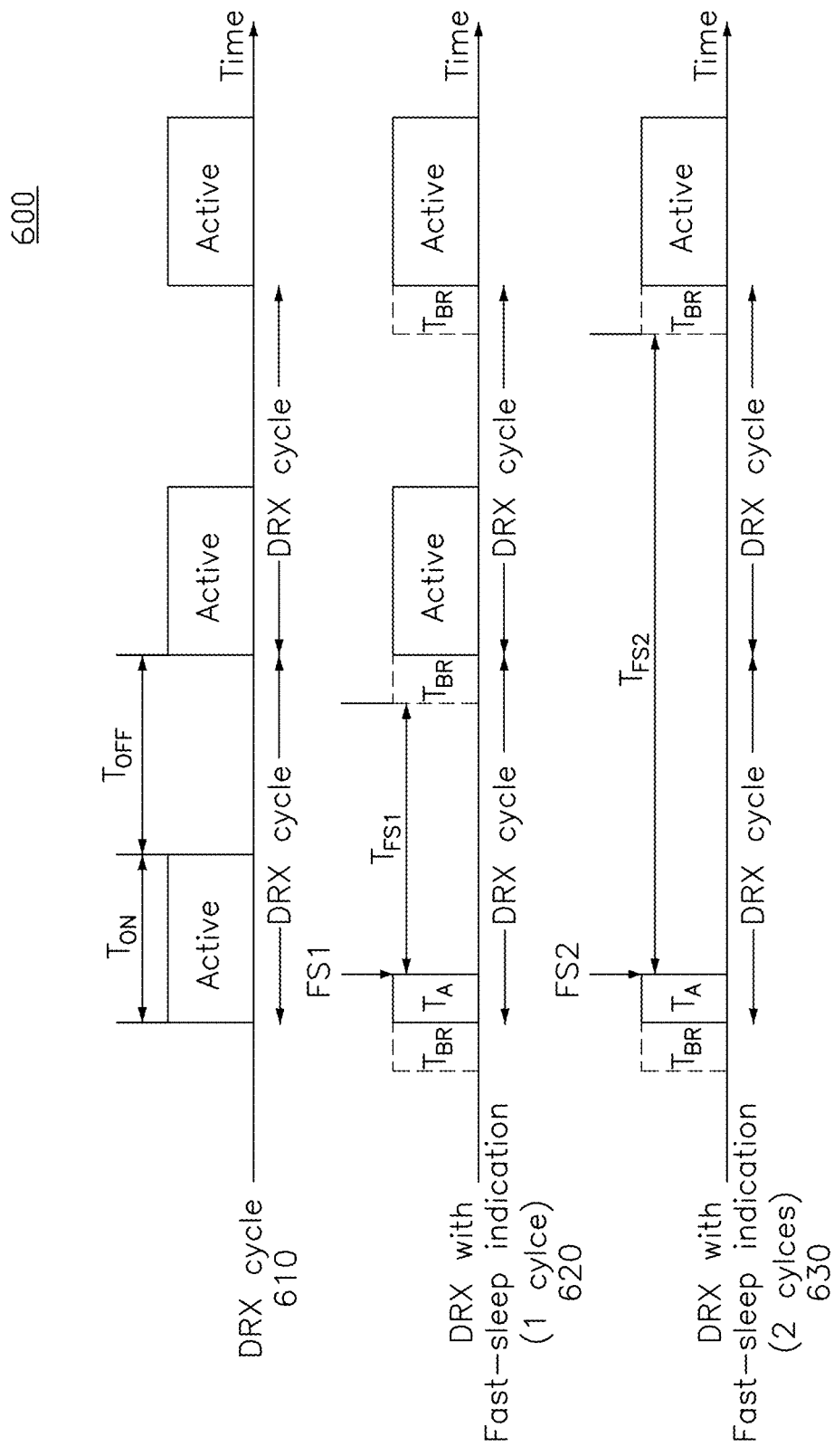
FIG. 6 is a schematic diagram for a comparison of three DRX configurations without fast-sleep indication and with fast-sleep indication according to an exemplary implementation of the present disclosure.

FIG. 6 is a schematic diagram 600 for a comparison of three DRX configurations without fast-sleep indication (610) and with fast-sleep indication (620, 630) according to an exemplary implementation of the present disclosure. In one implementation, the UE is configured to be inactive for a period of time in response to the fast-sleep indication. For example, as shown in 620, after receiving the fast-sleep indication (e.g., FS1) during the random access procedure for either the contention-free or contention-based beam recovery procedure (e.g., $T_A$), the UE transitions to the DRX off period and stays inactive for a period of time (e.g., $T_{FS1}$) until the next DRX on period. In another example, as shown in 630, after receiving the fast-sleep indication (e.g., FS2) during the beam failure recovery procedure (e.g., $T_A$), the UE transitions to the DRX off period and stays inactive for one more cycle (e.g., $T_{FS2}$). In yet another example, the inactive time period may be configured by absolute time (e.g., 10 ms).

Figure 7:
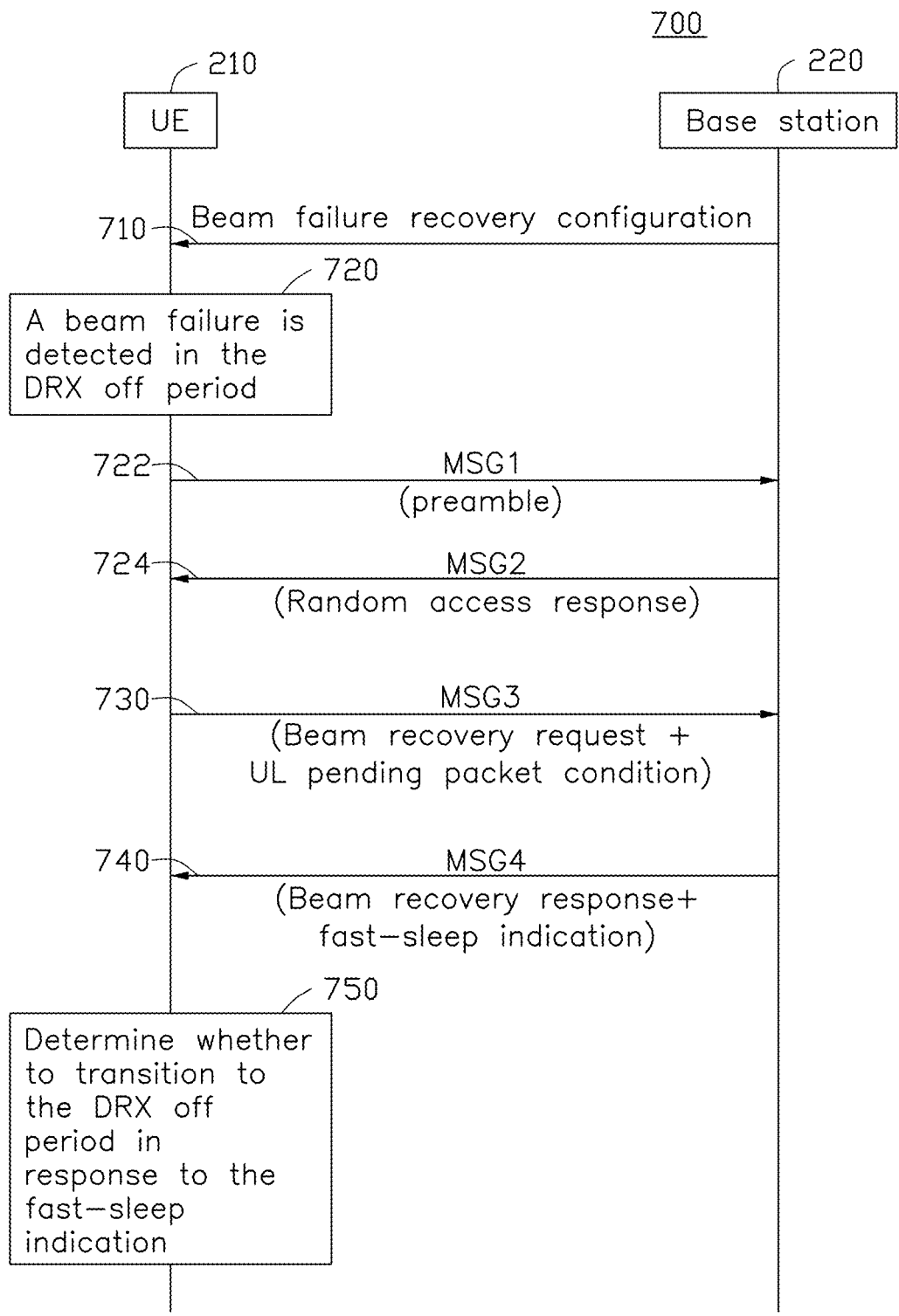
FIG. 7 is a schematic diagram of a method of power saving for a UE according to an exemplary implementation of the present disclosure.

FIG. 7 is a schematic diagram of a method 700 of power saving for a UE according to an exemplary implementation of the present disclosure. In this exemplary implementation, a wireless communication system includes a UE 210 and a base station 220. In action 710, the UE 210 receives a beam failure recovery configuration from the base station 220. In this exemplary implementation, a contention-based random access (CBRA) procedure is applied for the beam recovery procedure.

In action 720, a beam failure is detected in the DRX off period by the UE. In action 722, the UE 210 transmits a MSG1 to the base station 220 when the UE transitions from the DRX off period to a DRX on period. For example, the UE 210 selects a preamble from a preamble set, and then delivers the selected preamble on one selected physical resource block (PRB). Both the preamble set and RACH resources are provided by the base station 220 by broadcasting (e.g. system information).

In action 724, the base stations 220 transmits a MSG2 (e.g., random access response) to the UE 210. The base station 220 provides a UL grant for the UE 210 to deliver information in the following MSG3.

In action 730, after receiving the UL grant, the UE 210 transmits a beam recovery request via MSG3 to the base station 220. In one implementation, the UE 210 indicates the purpose of MSG3 is for beam recovery. In another implementation, the UE 210 provides UE ID (e.g. C-RNTI) in MSG3 to the base station 220 for identification. In one implementation, the base station 220 may configure (e.g. through the beam failure recovery configuration) the UE to report an uplink (UL) pending packet condition in MSG3.

In action 740, the UE 210 receives a beam recovery response via MSG4 from the base station 220. In one implementation, a fast-sleep indication is generated by the base station 220, and then be transmitted to the UE via MSG4. In action 750, the UE determines whether to transition to the DRX off period in response to the fast-sleep indication.

Figure 8:
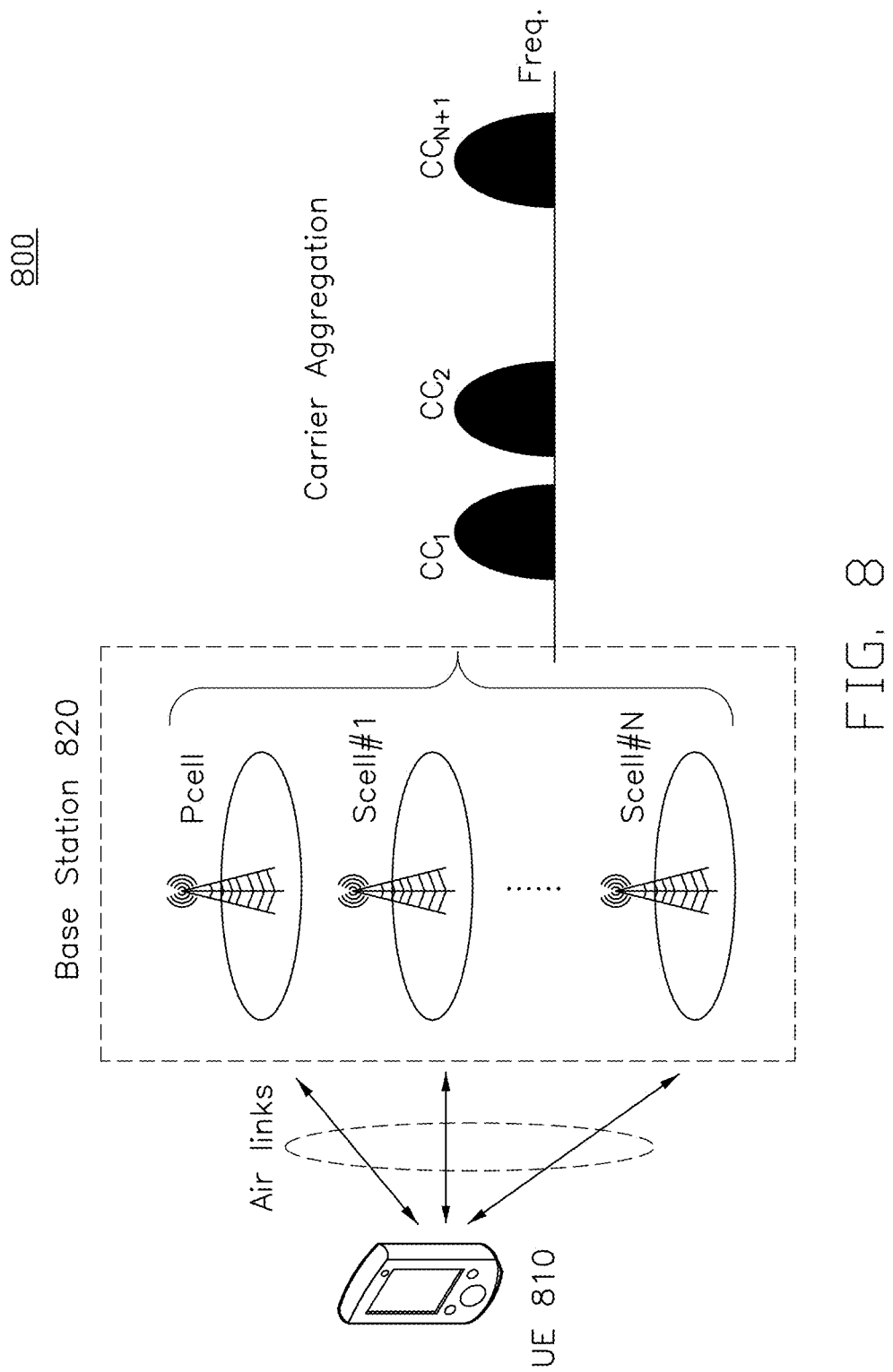
FIG. 8 is a schematic diagram of a wireless communication system supporting carrier aggregation (CA) according to an exemplary implementation of the present disclosure.

FIG. 8 is a schematic diagram of a wireless communication system 800 supporting carrier aggregation (CA) according to an exemplary implementation of the present disclosure. In this exemplary implementation, the wireless communication system 800 includes a UE 810 and a base station 820. As shown in FIG. 8, one UE 810 could be configured with multiple component carriers (e.g., $CC_1$, $CC_2$, ..., $CC_{N+1}$) in the frequency domain. The UE 810 is operating with one cell (e.g., Pcell, Scell#1, ..., Scell#N) in each component carrier (e.g., $CC_1$, $CC_2$, ..., $CC_{N+1}$). Therefore, the UE could apply these carriers simultaneously to boost the data rate. In addition, there is one Primary cell (e.g., Pcell), which is in charge with major radio access network (RAN) control functionalities (such as synchronization, radio resource configuration, RRC signaling exchange) to the UE in the CA scenario. Besides the Pcell, UE would also be configured with one or more Secondary cells (e.g., Scells).

With one or more Secondary Cells in the CA scenario, the data rate could be boosted. However, too many active Cells would also increase the power consumption of the UE 810 especially when the amount of pending DL packets for the UE varies with time. Therefore, in one implementation, the base station 820 could de-activate some Scells. Pcell may not be de-activated. In one implementation, the DRX cycle and active time applies to all the active cells of the UE(s) under CA scenario.

Figure 9:
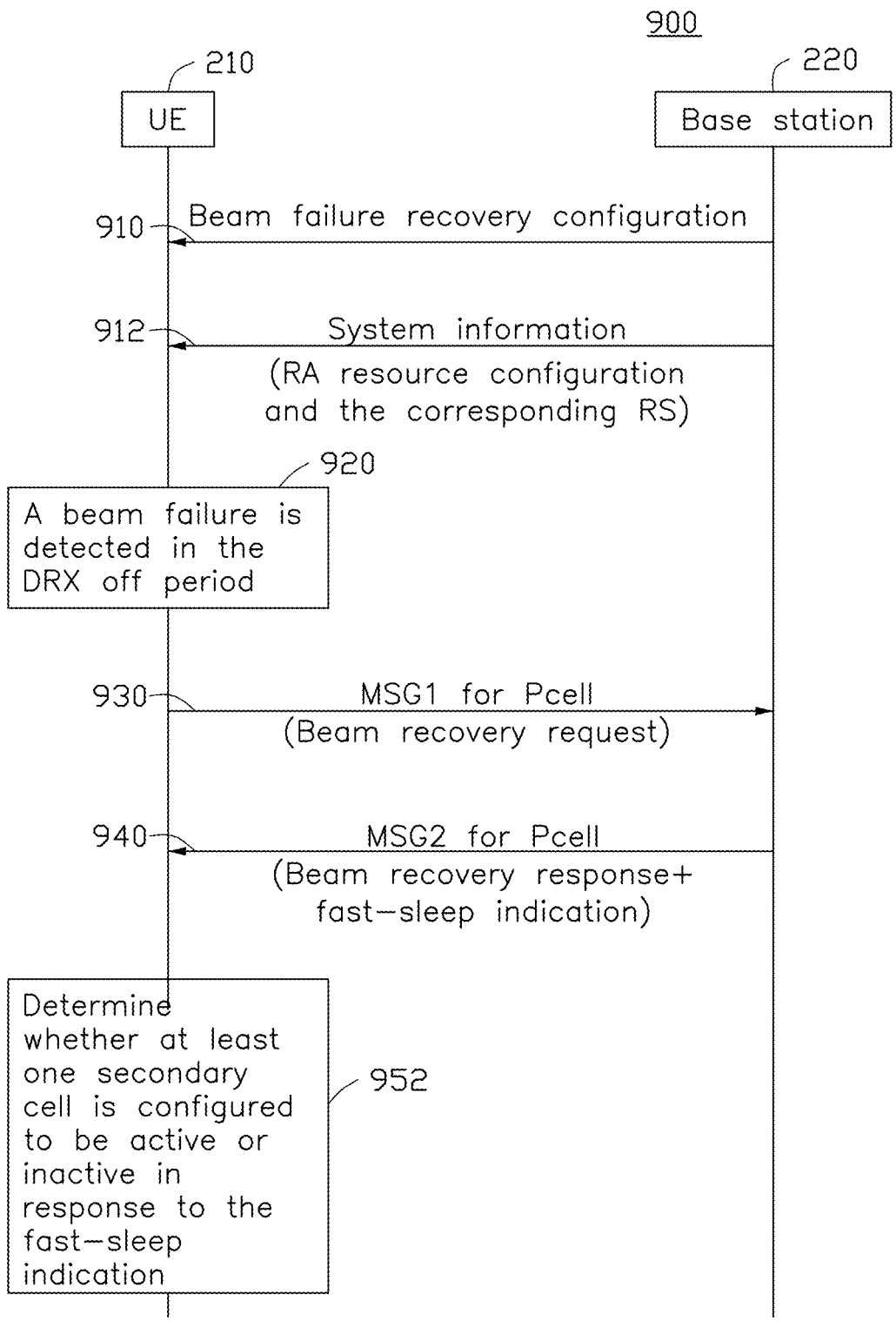
FIG. 9 is a schematic diagram of a method of power saving for a UE according to an exemplary implementation of the present disclosure.

FIG. 9 is a schematic diagram of a method 900 of power saving for a UE according to an exemplary implementation of the present disclosure. In this exemplary implementation, a wireless communication system includes a UE 210 and a base station 220, and the wireless communication system supports CA. In action 910, the UE 210 receives a beam failure recovery configuration from the base station 220. In this exemplary implementation, a CFRA procedure is applied for the beam recovery procedure. In another implementation, a CBRA procedure is applied for the beam recovery procedure.

In action 912, the least one association between a random access (RA) resource configuration and a corresponding reference signal (RS) is broadcasted by the base station 220 (e.g., through system information). In one implementation, the reference signal may include a SS block or a Channel State Information-Reference Signal (CSI-RS).

In CA scenario, the base station 220 may configure different association sets for each cell. Therefore, one additional cell index would be provided in the association set, as shown in Table 2.

TABLE 2

Association between RACH resource configuration and reference signal Association set#1

| | |
|---|---|
| Cell index | Scell#1, Scell#2 |
| Association index | #1 |
| Associated SS block index | SS_B#k |
| Preamble index | Preamble#1 |
| Physical resources for random access | PRB#i-PRB#j |
| Reference signal for beam recovery | CSI-RS index: CSI-RS#1 |

In some implementations, one association set may be applicable to more than one cell. In this condition, the cell index field may include a cell index list, as shown in Table 2. The UE could recognize each S cell by identifying the cell index. In some the implementations, a specific cell index may also be assigned to Pcell (such as '0X00'). After the UE receiving these association sets, UE may apply the association sets for CFRA procedure consistently for beam recovery.

In action 920, a beam failure is detected in the DRX off period by the UE. In this implementation, the UE 210 performs the beam recovery procedure for the Pcell by default after the beam failure on the Pcell is detected. For example, the UE 210 monitors the SS burst sets on the Pcell and transmits the MSG1 for the Pcell.

In action 930, the UE 210 transmits a beam recovery request via MSG1 for the Pcell to the base station 220. In one implementation, the base station 220 may configure (e.g. through the beam failure recovery configuration) the UE to report an uplink (UL) pending packet condition in MSG1.

In action 940, the UE 210 receives a beam recovery response via MSG2 for the Pcell from the base station 220. In one implementation, a fast-sleep indication is generated by the base station 220, and then be transmitted to the UE via MSG2.

In action 952, the UE 210 determines whether at least one secondary cell is configured to be active or inactive in response to the fast-sleep indication. For example, when the fast-sleep indication indicates at least one secondary cell is configured to be active and the beam failure events have been detected among these active cells, the UE 210 triggers the beam recovery procedure (e.g., actions 930 and 940) only for the active secondary cell and monitors the downlink control channels from the active secondary cell. In another example, when the fast-sleep indication indicates at least one secondary cell is configured to be inactive, the UE 210 will not trigger the beam recovery procedure for the inactive secondary cell (even if the beam failure events have been detected among these inactive secondary cell) and stop monitoring the downlink control channels from the inactive secondary cell. In yet another example, the fast-sleep indication indicates the state of each secondary cell is configured to be active or inactive. In this case, the UE 210 triggers the beam recovery procedure only for the active secondary cell on which the beam failure events have been detected, and monitors the downlink control channels from the active secondary cell, and the UE 210 will not trigger the beam recovery procedure for the inactive secondary cell (even if the beam failure events have been detected among this secondary cell) and stop monitoring the downlink control channels from the inactive secondary cell.

In some implementation, when a beam failure is detected in action 920, the UE 210 triggers the beam recovery procedure for one or more active cells. The one or more active cells may be pre-configured by the base station 220 (e.g., through a beam failure recovery configuration). In some other implementations, when a beam failure is detected in action 920, the UE 210 triggers the beam recovery procedure for one or more cells (default cell or pre-configured by the base station 220 through a beam failure recovery configuration), and then after receiving the fast-sleep indication, the UE 210 triggers the secondary beam recovery procedure for one of the other cells in response to the fast-sleep indication.

Figure 10:
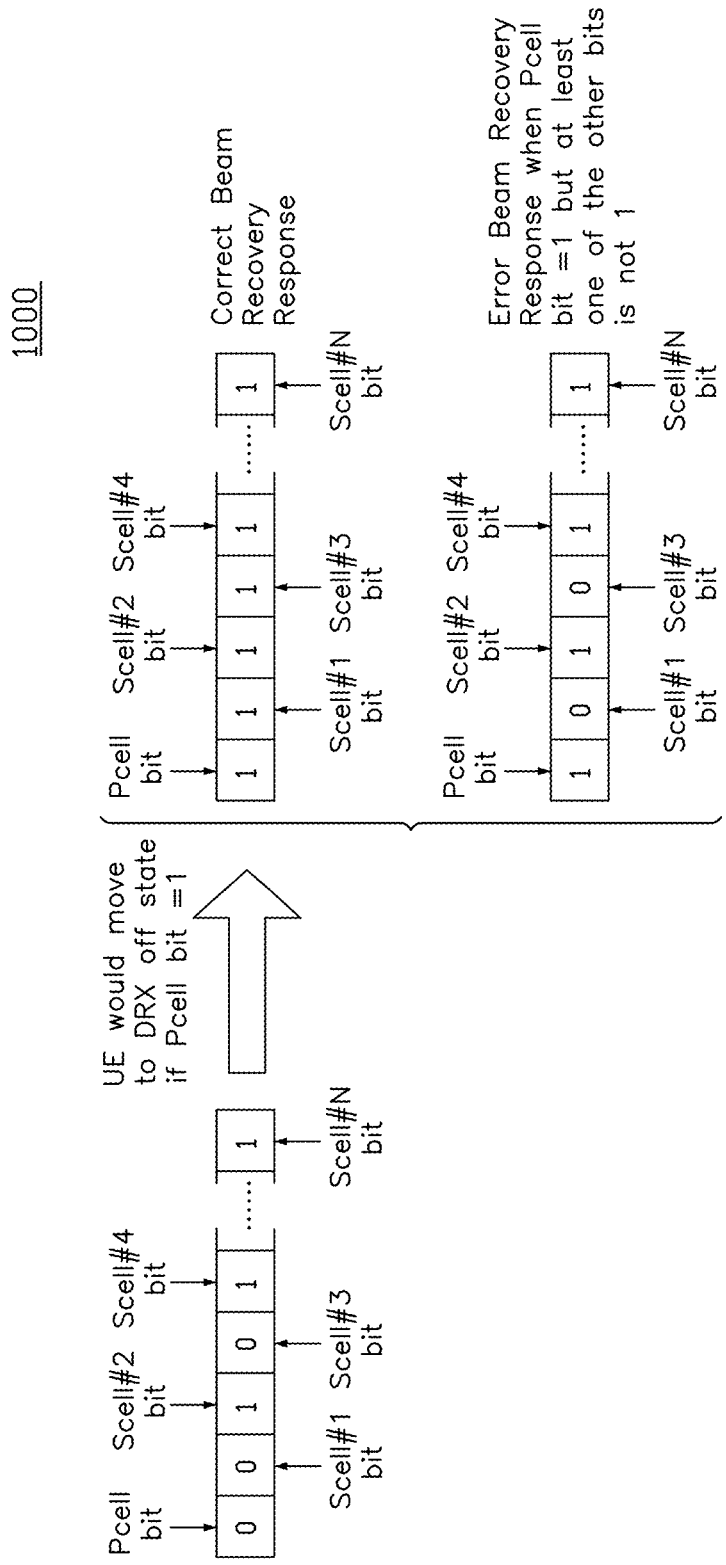
FIG. 10 is a schematic diagram of several examples of a fast-sleep indication according to an exemplary implementation of the present disclosure.

FIG. 10 is a schematic diagram 1000 of several examples of a fast-sleep indication according to an exemplary implementation of the present disclosure. In this exemplary implementation, a bitmap is provided as the fast-sleep indication including N+1 bits, where a base station having 1 Pcell and N Scells. Each bit correspondingly indicates whether a cell is configured to be active or inactive. For instance, the first bit corresponds to the Pcell, the second bit is corresponding to the SCell#1, and the third bit is corresponding to the SCell#2, and so on. When a bit is set to be "1", the cell is configured to be inactive, and the UE stops monitoring the downlink control channels from the cell. On the other hand, when the bit is set to be "0", the cell is configured to be active, and the UE triggers the beam recovery procedure for the cell before monitoring the downlink control channel.

As shown in FIG. 10, in one implementation, the base station configures the Pcell to be active, and the first and the third Scells to be active, and therefore the Pcell bit, Scell#1 bit and the Scell#3 bit are set to be "0", and the other Scells (Scell#2, Scell#4, . . . , Scell#N) bits are set to be "1".

In another implementation, when the Pcell is configured to be inactive, all of the Scells must be configured to be inactive (all bits are set to be "1"). When a fast-sleep indication indicating the Pcell is configured to be inactive (e.g., Pcell bit set to be "1") and at least one of the Scell configured to be active (e.g., Scell#1 bit and Scell#3 bit set to be "0") is received, the UE may consider that the beam recovery response is received with error. Therefore, the UE could apply error check by checking the Pcell bit with other bits. When the error occurs, the UE could re-send the beam recovery request to the base station again. In some other implementations, the base station configures only the S cells in the fast-sleep indication. Therefore, there is no Pcell bit in the bitmap of fast-sleep indication.

Figure 11:
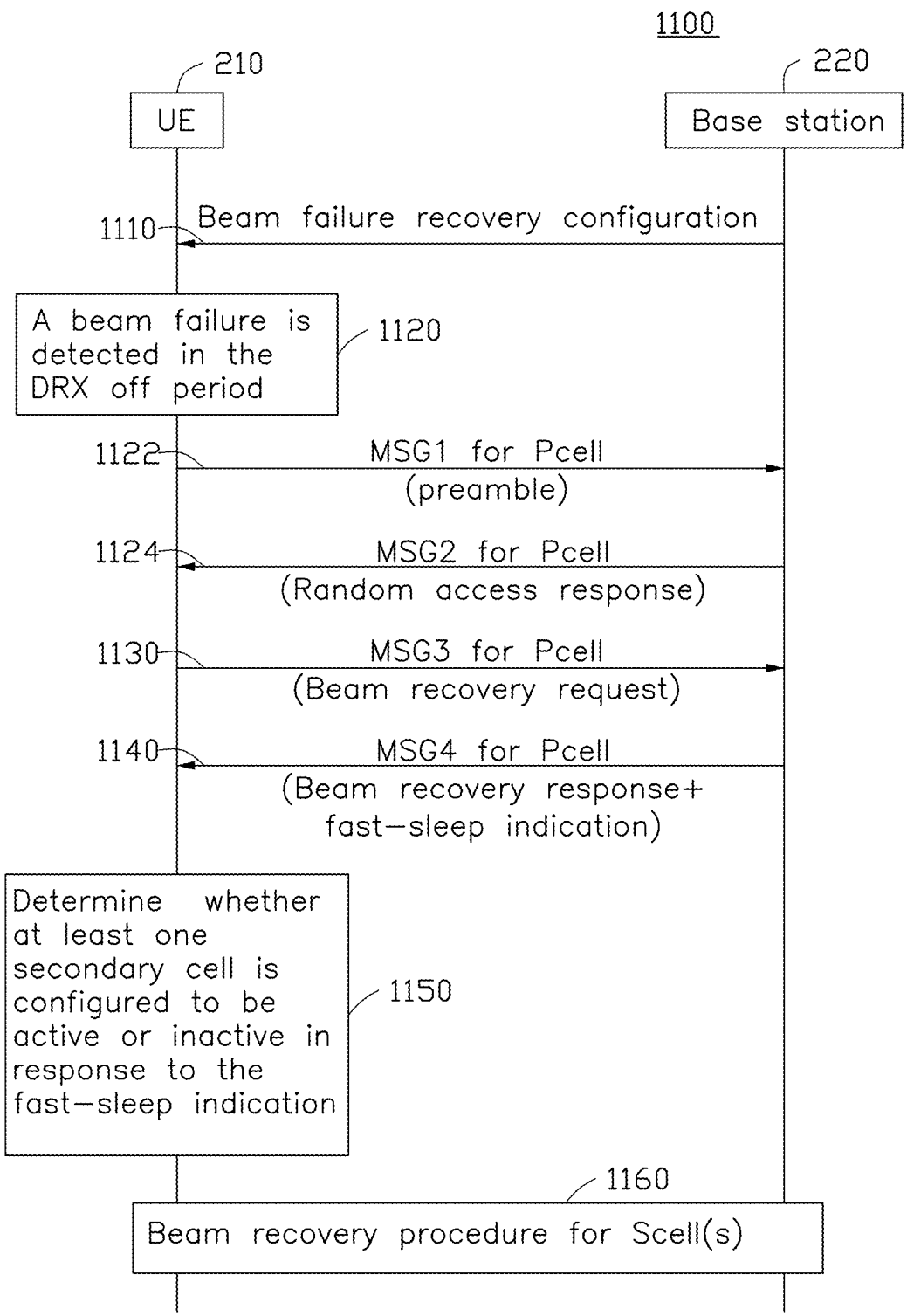
FIG. 11 is a schematic diagram of a method of power saving for a UE according to an exemplary implementation of the present disclosure.

FIG. 11 is a schematic diagram of a method 1100 of power saving for a UE according to an exemplary implementation of the present disclosure. In this exemplary implementation, a wireless communication system includes a UE 210 and a base station 220, and the wireless communication system supports CA. In action 1110, the UE 210 receives a beam failure recovery configuration from the base station 220. In this exemplary implementation, a CBRA procedure is applied for the beam recovery procedure. In another implementation, a CFRA procedure is applied for the beam recovery procedure.

In action 1120, a beam failure is detected in the DRX off period by the UE. In this exemplary implementation, a 2-stages beam recovery procedure is performed by the UE. In this implementation, the Pcell is the default cell for performing the first beam recovery procedure (e.g., actions 1122, 1124, 1130 and 1140), and one or more Scells may be configured for performing the secondary beam recovery procedure (e.g., action 1160) in response to the fast-sleep indication.

In some implementations, one or more cell for performing the first beam recovery procedure may be pre-configured by the base station 220 (e.g., through beam failure recovery configuration in action 1110), and then the other cells for performing the secondary beam recovery procedure may be triggered in response to the fast-sleep indication.

In action 1122, the UE 210 transmits a MSG1 for the Pcell to the base station 220 when the UE transitions from the DRX off period to a DRX on period. In action 1124, the base stations 220 transmits a MSG2 for the Pcell (e.g., random access response) to the UE 210. In action 1130, the UE 210 transmits a beam recovery request for the Pcell via MSG3 to the base station 220. In action 1140, the UE 210 receives a beam recovery response for the Pcell via MSG4 from the base station 220. In one implementation, a fast-sleep indication is generated by the base station 220, and then be transmitted to the UE via MSG4.

In action 1150, the UE 210 determines whether at least one secondary cell is configured to be active or inactive in response to the fast-sleep indication. In one implementation, the fast-sleep indication is a bit, when the fast-sleep indication is set to be "1", the UE 210 terminates the first beam recovery procedure and transitions to the DRX off period immediately without triggering the secondary beam recovery procedure. On the other hand, when the fast-sleep indication is set to be "0", the UE triggers the secondary beam recovery procedure for all the other active cells.

In one implementation, the fast-sleep indication is a bitmap includes multiple bits (e.g., as shown in FIG. 10). When the fast-sleep indication indicates at least one secondary cell is configured to be active, the UE 210 triggers the secondary beam recovery procedure only for the active secondary cell on which the beam failure events have been detected, and monitors the downlink control channels from the active secondary cell, and the UE 210 will not trigger the secondary beam recovery procedure for the inactive secondary cell and stop monitoring the downlink control channels from the inactive secondary cell.

In action 1160, the UE 210 performs the secondary beam recovery procedure in response to the fast-sleep indication. In one implementation, the secondary beam recovery procedure is realized by a CBRA procedure. In another implementation, the secondary beam recovery procedure is realized by a CFRA procedure.

Figure 12:
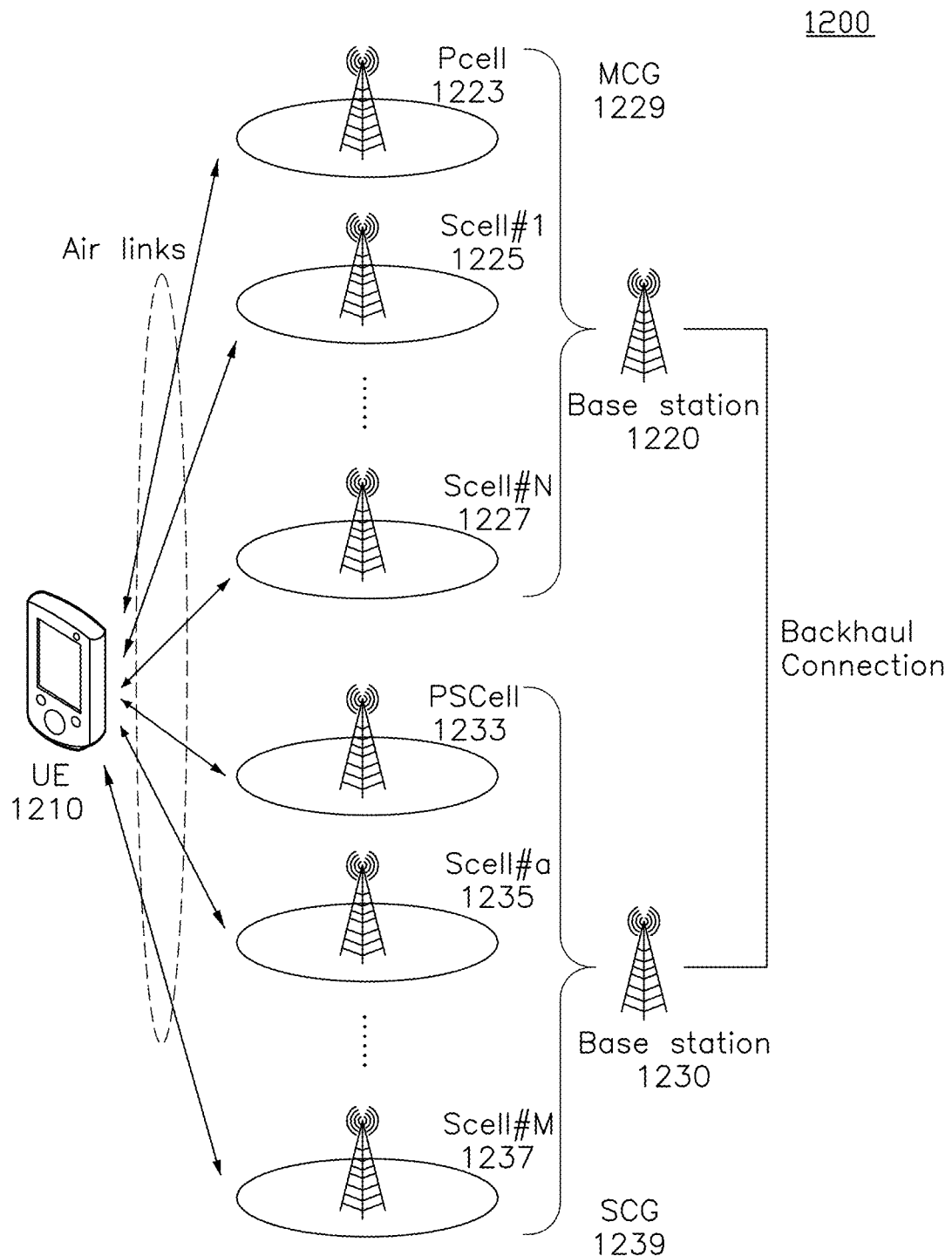
FIG. 12 is a schematic diagram of a wireless communication system supporting dual connectivity (DC) according to an exemplary implementation of the present disclosure.

FIG. 12 is a schematic diagram of a wireless communication system 1200 supporting dual connectivity (DC) according to an exemplary implementation of the present disclosure. In this exemplary implementation, the wireless communication system 1200 includes a UE 1210 and two base stations 1220 and 1230. One base station is called a Master eNB or a Master gNB (MeNB or MgNB, e.g., 1220) and another is called a Secondary eNB or a Secondary gNB (SeNB or SgNB, e.g., 1230). The MeNB or MgNB (e.g., 1220) plays a major role in RAN control (such as RRC signaling delivery, core network control signaling delivery). Each base station (e.g., 1220 and 1230) has its own radio resource scheduling entities (a.k.a. MAC entity) so that each base station could deliver its own radio resource scheduling message to the UE independently. Both the base stations 1220 and 1230 could configure multiple component carriers and the corresponding multiple cells for the UE. A group of cells (e.g., Pcell 1223, Scell#1 1225, . . . , Scell#N 1227) controlled by the MeNB or MgNB (e.g., 1220) is called master cell group (e.g., MCG 1229) and the group of cells (e.g., PScell 1233, Scell#a 1235, . . . , Scell#M 1237) controlled by the SeNB or SgNB (e.g., 1230) is called secondary cell group (e.g., SCG 1239).

Similar to CA, the primary cell (e.g., Pcell 1223) of the base station 1220 and the primary secondary cell (e.g., PScell 1233) of the base station 1230 are in charge of major RAN control functionalities in MCG 1229 and SCG 1239 respectively. Pcell 1223 and PScell 1233 are also called special cells because of their importance in MCG 1229/SCG 1239. Each base station (e.g., 1220 and 1230) could configure its own beam failure configuration independently. The beam failure configuration delivered by the base station 1220 (through Pcell) is valid for the MCG 1229, and the beam failure configuration delivered by the base station 1230 (through PScell) is valid for the SCG 1239. Therefore, the DRX cycle and active time of MCG 1229/SCG 1239 applies to all the active Cells of MCG 1229/SCG 1239 respectively.

Figure 13:
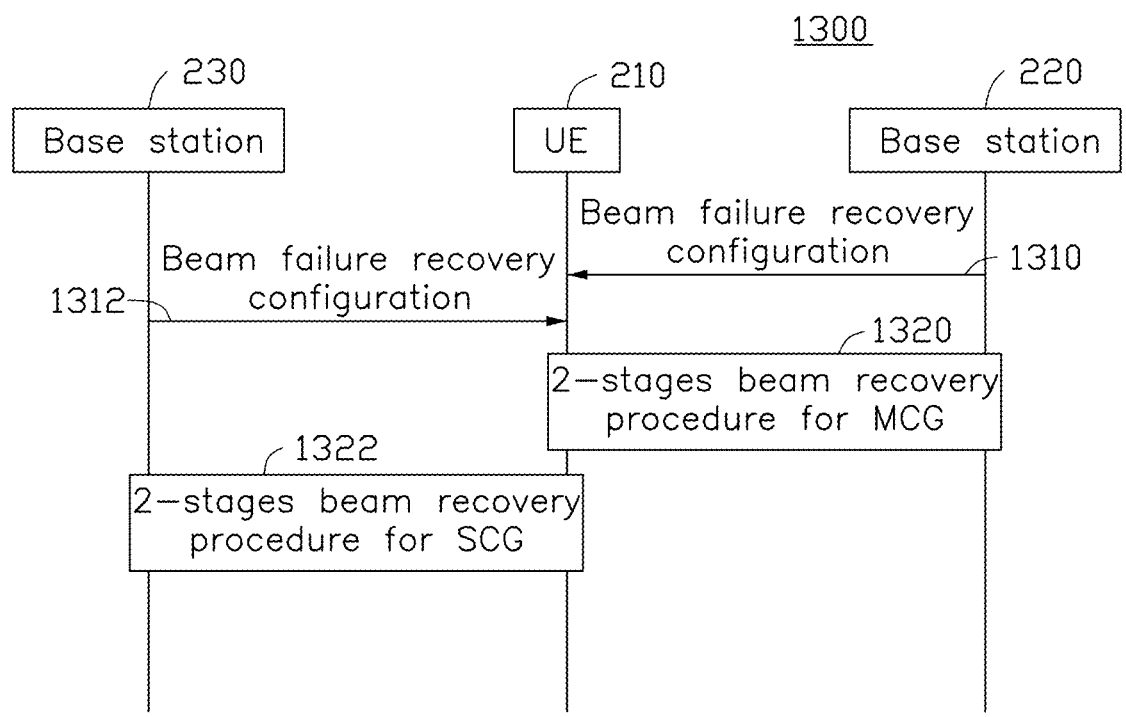
FIG. 13 is a schematic diagram of a method of power saving for a UE according to an exemplary implementation of the present disclosure.

FIG. 13 is a schematic diagram of a method 1300 of power saving for a UE according to an exemplary implementation of the present disclosure. In this exemplary implementation, a wireless communication system includes a UE 210 and two base stations 220 and 230, and the wireless communication system supports DC. In action 1310, the UE 210 receives a beam failure recovery configuration for MCG from the base station 220. In one implementation, a CFRA procedure is applied for the beam recovery procedure. In another implementation, a CBRA procedure is applied for the beam recovery procedure. In action 1320, the UE 210 performs a 2-stages beam recovery procedure for MCG.

In action 1312, the UE 210 receives a beam failure recovery configuration for SCG from the base station 230. In action 1322, the UE 210 performs a 2-stages beam recovery procedure for SCG. It is noted that, in some implementations, the base station 230 would transmit its own beam failure recovery configuration to the base station 220 through backhaul connection and then the base station 220 would forward the beam failure recovery configuration of the base station 230 to the UE.

In one implementation, the UE 210 may be configured with more than two carrier groups. Thus, the 2 stages beam recovery procedures can be applied to more than two MAC entities of the UE side independently.

Based on the above, several methods for power saving for the UE and wireless communications are provided in this disclosure. The implementations shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method of power saving for a user equipment (UE), comprising:
receiving a first indicator from a first base station during a first discontinuous reception (DRX) off-period that is configured for a first cell group, the first cell group being managed by the first base station;
determining, based on the first indicator, whether to stop monitoring at least one first downlink control channel of at least one first active cell of the first cell group during at least one first DRX on-period that is configured for the first cell group, the at least one first DRX on-period being subsequent to the first DRX off-period;

receiving a beam failure recovery configuration from the first base station;

determining whether a beam failure is detected;

when the beam failure is detected during the first DRX off-period:
transmitting a beam recovery request to the first base station when the UE transitions from the first DRX off-period to the at least one first DRX on-period, the beam recovery request being generated in response to a special cell coupled to the first base station; and
receiving a first beam recovery response including the first indicator from the first base station;

determining whether at least one secondary cell is configured to be active or inactive in response to the first indicator; and transmitting a secondary beam recovery request corresponding to the at least one secondary cell to the first base station when the beam failure is detected on the at least one secondary cell and the at least one secondary cell is configured to be active.

2. A method for power saving of a base station, comprising:

configuring an active or inactive state of at least one secondary cell;

generating a first indicator in response to the active or inactive state of the at least one secondary cell, the first indicator indicating to a user equipment (UE) whether to stop monitoring at least one first downlink control channel of at least one first active cell of a first cell group during at least one first discontinuous reception (DRX) on-period that is configured for the first cell group, the at least one first DRX on-period being subsequent to a first DRX off-period;

transmitting the first indicator to the UE during the first DRX off-period that is configured for the first cell group, the first cell group being managed by the base station;

transmitting a beam failure recovery configuration to the UE;

receiving a beam recovery request from the UE when the UE transitions from the first DRX off-period to the at least one first DRX on-period, the beam recovery request being generated in response to the beam failure recovery configuration;

transmitting a beam recovery response including the first indicator to the UE; and receiving a secondary beam recovery request corresponding to the at least one secondary cell when a beam failure is detected on the at least one secondary cell and the at least one secondary cell is configured to be active.

3. The method of claim 2, wherein the beam failure recovery configuration is associated with a primary cell in a Master Cell Group (MCG) or a primary secondary cell in a Secondary Cell Group (SCG).

4. A user equipment (UE), comprising:
a processor configured to perform instructions for:
receiving a beam failure recovery configuration from a first base station;

determining whether a beam failure is detected;

when the beam failure is detected during a first discontinuous reception (DRX) off-period:
transmitting a beam recovery request to the first base station when the UE transitions from the first DRX off-period to at least one first DRX on-period, the beam recovery request being generated in response to a special cell coupled to the first base station; and
receiving a first beam recovery response including a first indicator from the first base station during the first DRX off-period that is configured for a first cell group, the first cell group being managed by the first base station;

determining, based on the first indicator, whether to stop monitoring at least one first downlink control channel of at least one first active cell of the first cell group during the at least one first DRX on-period that is configured for the first cell group, the at least one first DRX on-period being subsequent to the first DRX off-period;

determining whether at least one secondary cell is configured to be active or inactive in response to the first indicator; and transmitting a secondary beam recovery request corresponding to the at least one secondary cell to the first base station when the beam failure is detected on the at least one secondary cell and the at least one secondary cell is configured to be active.

5. A base station, comprising:
a processor configured to perform instructions for:
configuring an active or inactive state of at least one secondary cell;

generating a first indicator in response to the active or inactive state of the at least one secondary cell;

transmitting a beam recovery response including the first indicator to a user equipment (UE);

transmitting a first indicator configuration to the UE during a first discontinuous reception (DRX) off-period that is configured for a first cell group, the first cell group being managed by the base station;

wherein the first indicator indicates the UE whether to stop monitoring at least one first downlink control channel of at least one first active cell of the first cell group during at least one first DRX on-period that is configured for the first cell group, the at least one first DRX on-period being subsequent to the first DRX off-period;

transmitting a beam failure recovery configuration to the UE;

receiving a beam recovery request from the UE when the UE transitions from the first DRX off-period to the at least one first DRX on-period, the beam recovery request being generated in response to the beam failure recovery configuration; and receiving a secondary beam recovery request corresponding to the at least one secondary cell when a beam failure is detected on the at least one secondary cell configured to be active.

6. The base station of claim 5, wherein the beam failure recovery configuration is associated with a primary cell in a Master Cell Group (MCG) or a primary secondary cell in a Secondary Cell Group (SCG).

* * * * *